UNITED STATES PATENT OFFICE.

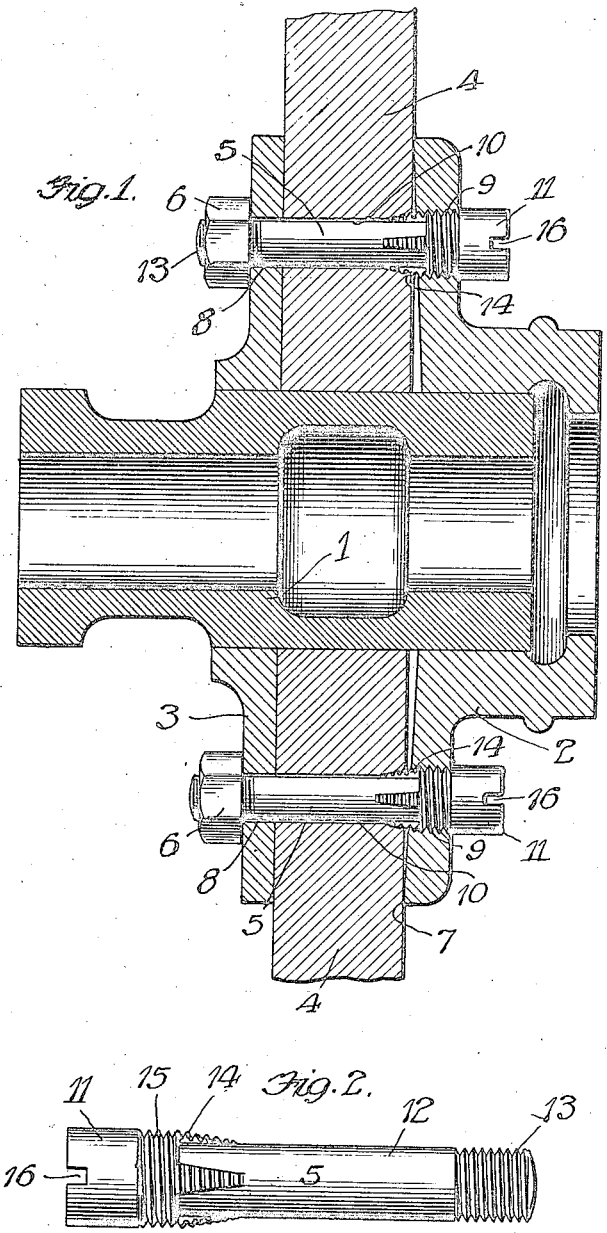

IRVING C. WOODWARD, OF CHICAGO, ILLINOIS.

BOLT FOR DEMOUNTABLE WHEELS.

1,426,802.  Specification of Letters Patent.  Patented Aug. 22, 1922.

Application filed April 19, 1920. Serial No. 375,060.

*To all whom it may concern:*

Be it known that I, IRVING C. WOODWARD, a citizen of the United States of America, and a resident of Chicago, county of Cook, and State of Illinois, have invented certain new and useful Improvements in Bolts for Demountable Wheels, of which the following is a specification.

The main objects of this invention are to provide an improved bolt for wheels of the demountable type, the removal of which form its hub, either for the purpose of replacing or repairing it, is made convenient and facile; to provide an improved type of bolt which is adapted to be so locked in position that it is held against turning when it is necessary to apply considerable force to remove nuts that have become rusted or otherwise adhered to the bolt and at the same time is held against shifting endwise when it is sought to bring the several holes in the wheel into position to have the bolts inserted therein; and to provide a bolt of this kind which, notwithstanding its being locked in place, may be wobbled slightly so as to insure registration with the hole in the wheel.

An illustrative embodiment of this invention is shown in the accompanying drawings, in which—

Fig. 1 is a sectional detail of the hub and adjacent portions of a wheel secured together with bolts constructed in accordance with this invention.

Fig. 2 is an enlarged detail of one of the bolts by which the wheel is attached to the hub.

It is the purpose of this invention to provide a bolt of such simple nature that the removal of a wheel from a hub and replacement thereon is made easy and convenient in order that the time of a vehicle driver may be saved through making it possible to substitute a new wheel with a tire already mounted thereon for a wheel on which the tire has given out, rather than to require the removal of the old tire and the replacement thereof with a new one. The construction is particularly useful on automobiles where the parts of the automobile frame and body, such, as for instance, the emergency brake devices, are arranged so closely to the wheel hub that access to the bolts or nuts from the inside of the wheel is made difficult and, in many cases, impossible, except after other parts of the vehicle have been removed.

In the specific embodiment herein shown, the wheel comprises the usual hub 1, disks or plates 2 and 3, a wheel part 4 which are held in their assembled relation by bolts 5 constructed and arranged so that the wheel part 4 is firmly clamped upon the hub 1 between the disks or plates 2 and 3 in such a manner that when it is necessary the wheel part 4 may be readily removed either for the purpose of replacing it with another or repairing same.

As herein shown the hub 1 and the plates 2 and 3 are of a well known form generally used on one of the cars of lighter construction. The disk or plate 2, which in this type of wheel hub is the inner disk, is rigidly secured to the inner end of the hub 1 and has the face thereof concavely formed so that the peripheral edge 7 thereof is the more firmly forced into engagement with the wheel part 4. The plate or disk 3 is adjustably supported upon the hub 1 so as to be drawn by the bolts 5 and nuts 6 to firmly clamp the wheel part 4 between said disks. The wheel part 4 in this particular type of wheel is of the usual wood construction. The disks 2 and 3 and the wheel part 4 are provided with coaxially arranged apertures or holes 8, 9 and 10, respectively, the apertures 9 in the plate 2 being threaded as indicated in Fig. 1.

The bolts 5 are preferably a metal forging, having a cylindrical shaped head 11, shank 12, and a threaded end 13 upon which the nuts 6 fit. Inclined shoulders 14 are formed on the shank 12 adjacent to the head 11. These shoulders and an adjacent portion of the cylindrical head 11 are provided with a thread 15. The thread 15 is run back on the head 11 such a distance that the bolts may be screwed into the threaded apertures 9 and have the shoulders 14 protrude beyond the concave face of the plate or disk 2. These shoulders 14 with their threaded or roughened outer faces are adapted to be drawn or wedged into the ends of the apertures 10 when the wheel part 4 is being clamped between the disks 2 and 3 by the drawing up thereof with the nuts 6. As this drawing up of the parts takes place the wood is gradually chiseled away by the drawing of the threaded shoulders into the wood so that the bolt becomes firmly fixed against rotation. It is therefore possible to apply considerable force to the nuts 6 either in drawing up the bolts and nuts to clamp the disks 2 and 3 to the wheel part 4 or to unloosen the nuts 6 when it is desired to remove the wheel part 4. This securing of the bolts against rotation is particularly advantageous when the nuts 6 have become rusted or otherwise set on the bolts 5, when, if the bolts were not held against rotation, it might be difficult or impossible to remove the nuts 6 without mutilation thereof or of the bolts.

By having the bolts 5 provided with the threads 15 the bolts are held against accidental endwise or axial movement when it is desired to bring a number of the bolts into registration with the holes 10 in the wheel part 4 when replacing a wheel part upon the hub 1. The threads 15 are usually cut under-size so that the bolts 5 may be wobbled slightly on their axes in order to facilitate their being brought into registration with the holes 10, particularly where a new wheel part 4 is being placed upon the hub, in which case the holes 10 might not register exactly with the holes or apertures 8 in the disk 2.

The heads 11 of the bolts 5 are provided with screw-driver slots 16 by which they may be turned into or out of the threaded apertures 8.

Although but one specific embodiment of this invention has been herein shown and described, it will be understood that some details of the construction shown may be altered or omitted without departing from the spirit of this invention as defined by the following claims.

I claim:

1. A bolt for clamping two or more parts together, comprising a head on one end, a nut threaded on the other end of said bolt, tapered shoulders formed on the shank adjacent said head and spaced apart circumferentially, and a thread formed on a portion of said head adjacent said shoulders and on said shoulders, said threaded head being adapted to be screwed into a threaded aperture in one of said parts to secure said bolt against accidental axial movement, said shoulders extending axially of said bolt so that by the drawing up of the bolt and nut they are adapted to be wedged into one of said parts adjacent to a bolt hole for securing the bolt against rotation relative to said part.

2. A bolt for clamping two or more parts together, comprising a cylindrical shaped head on one end, a nut threaded on the other, means on said bolt adapted to coact with a suitably shaped aperture in one of said parts for securing said bolt against accidental axial movement but permitting it to wobble relative to said part, inclined shoulders formed on the shank adjacent to said head, and a thread formed on a portion of said head adjacent to said shoulders and on said shoulders, said shoulders being adapted to be wedged into a bolt hole by the drawing up of the bolt and nut so as to secure the bolt against rotation.

Signed at Chicago this 10th day of April, 1920.

IRVING C. WOODWARD.